(12) United States Patent
Yonezawa

(10) Patent No.: US 11,095,899 B2
(45) Date of Patent: Aug. 17, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Keiko Yonezawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/138,836

(22) Filed: Sep. 21, 2018

(65) Prior Publication Data
US 2019/0104314 A1 Apr. 4, 2019

(30) Foreign Application Priority Data

Sep. 29, 2017 (JP) .............................. JP2017-191759

(51) Int. Cl.
| | |
|---|---|
| *H04N 19/14* | (2014.01) |
| *H04N 19/176* | (2014.01) |
| *H04N 19/124* | (2014.01) |
| *H04N 19/51* | (2014.01) |
| *H04N 19/17* | (2014.01) |
| *H04N 19/137* | (2014.01) |

(52) U.S. Cl.
CPC .......... *H04N 19/14* (2014.11); *H04N 19/124* (2014.11); *H04N 19/137* (2014.11); *H04N 19/17* (2014.11); *H04N 19/176* (2014.11); *H04N 19/51* (2014.11)

(58) Field of Classification Search
CPC .... H04N 19/14; H04N 19/124; H04N 19/137; H04N 19/17; H04N 19/176; H04N 19/51

USPC .......................................................... 375/240
See application file for complete search history.

(56) References Cited

U.S. PATENT DOCUMENTS

| | | | |
|---|---|---|---|
| 6,754,371 B1* | 6/2004 | Kondo ................... | H04N 5/144 348/700 |
| 2010/0119157 A1* | 5/2010 | Kameyama ............ | H04N 19/59 382/195 |

(Continued)

FOREIGN PATENT DOCUMENTS

| | | |
|---|---|---|
| JP | 2008-219147 A | 9/2008 |
| JP | 2009268089 A | 11/2009 |
| JP | 2010-130558 A | 6/2010 |

*Primary Examiner* — Joseph G Ustaris
*Assistant Examiner* — Matthew David Kim
(74) *Attorney, Agent, or Firm* — Canon U.S.A., Inc. IP Division

(57) ABSTRACT

An image acquisition unit acquires an image frame of a moving image captured by an image capturing unit. A moving object detection unit performs moving object detection processing for detecting a moving object from the image frame acquired by the image acquisition unit. An encoding unit encodes the image frame acquired by the image acquisition unit, based on a result of the moving object detection processing performed by the moving object detection unit. The encoding unit encodes a changed region, which is a region changed from a moving-object region obtained on the basis of a result of the moving object detection processing in an image frame preceding an image frame to be encoded, to a non-moving-object region in the image frame to be encoded, by using encoding control or an encoding parameter different from encoding control or an encoding parameter for other non-moving-object region.

7 Claims, 10 Drawing Sheets

(56) References Cited

U.S. PATENT DOCUMENTS

| | | | |
|---|---|---|---|
| 2011/0052089 A1* | 3/2011 | Noguchi | H04N 19/115 |
| | | | 382/250 |
| 2014/0297885 A1* | 10/2014 | Bae | H04N 19/172 |
| | | | 709/231 |
| 2015/0281715 A1* | 10/2015 | Lawrence | G06T 7/215 |
| | | | 375/240.16 |
| 2016/0100166 A1* | 4/2016 | Dragne | H04N 19/124 |
| | | | 375/240.03 |
| 2016/0191933 A1* | 6/2016 | Ikai | H04N 19/503 |
| 2016/0328627 A1* | 11/2016 | Fuju | G06F 21/6254 |
| 2017/0359601 A1* | 12/2017 | Sievers | H04N 9/8205 |
| 2018/0352259 A1* | 12/2018 | Guo | H04N 19/619 |
| 2019/0007678 A1* | 1/2019 | Perez-Ramirez | H04N 19/109 |
| 2019/0172039 A1* | 6/2019 | Kambara | G06T 7/20 |

* cited by examiner

IMAGE PROCESSING APPARATUS, IMAGE PROCESSING METHOD, AND STORAGE MEDIUM

BACKGROUND OF THE INVENTION

Field of the Invention

The present invention relates to an image processing technology.

Description of the Related Art

In recent years, as smartphones and digital video cameras have become widespread, opportunities of capturing images and generating image data have been increasing. However, there is a limit to storage capacity for recording data, and communication bandwidth in transmitting and receiving data. Therefore, a technology for efficiently compressing image data is desired. A standard called H.264/AVC has been known as a method of image compression. In addition, a standard called H.265/HEVC has started to come into widespread use.

In an image encoding technology, parameters such as a quantization parameter are prescribed to adjust image quality. It is desired to minimize a data amount while preventing degradation in image quality, by using these parameters.

Japanese Patent Application Laid-Open No. 2010-130558 discusses a method for calculating a motion vector for each macroblock, detecting a motion boundary region between a motion region and a still region based on the value of the motion vector, and setting a quantization parameter of the motion boundary region. Further, Japanese Patent Application Laid-Open No. 2008-219147 discusses a method for setting an encoding mode, based on characteristics such as a motion characteristic and a flatness characteristic of a macroblock.

However, in the method of Japanese Patent Application Laid-Open No. 2010-130558, using the motion vector, a location is selected where a quantization residual error is small, and the selection does not necessarily match with the motion. Therefore, degradation in image quality cannot be effectively prevented in some cases. In Japanese Patent Application Laid-Open No. 2010-130558, detection using a threshold is difficult in a case where a motion speed is low. In Japanese Patent Application Laid-Open No. 2008-219147, the encoding mode is set in consideration of subjective quality. If these conventional technologies are employed, image quality may be partially significantly degraded depending on the image.

SUMMARY OF THE INVENTION

The present disclosure is directed to providing a technology that can reduce likelihood of generating a region where image quality is significantly degraded compared with other regions in an image, when encoding is performed. To provide such a technology, an image processing apparatus of the present disclosure includes, for example, the following configuration.

According to an aspect of the present disclosure, an image processing apparatus includes an image acquisition unit configured to acquire an image frame of a moving image captured by an image capturing unit, a moving object detection unit configured to perform moving object detection processing for detecting a moving object from the image frame acquired by the image acquisition unit, and an encoding unit configured to encode the image frame acquired by the image acquisition unit, based on a result of the moving object detection processing performed by the moving object detection unit, wherein the encoding unit encodes a changed region, which is a region changed from a moving-object region obtained on the basis of a result of the moving object detection processing in an image frame preceding an image frame to be encoded, to a non-moving-object region in the image frame to be encoded, by using encoding control or an encoding parameter different from encoding control or an encoding parameter for other non-moving-object region.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings. A configuration described in each of the following exemplary embodiments is only an example, and the present disclosure is not limited to the configuration described in the following exemplary embodiments. In each of the exemplary embodiments, image capturing for the purpose of monitoring will be described as an example, but they can be applied to image-capturing technologies for various purposes such as broadcasting. In addition, an image capturing apparatus (a network camera) capable of communicating with other apparatuses through connection to a network will be described below as an example, but the embodiments can be applied also to an image capturing apparatus incapable of connecting to the network. In addition, an image capturing apparatus having a function as an image processing apparatus will be described as an example, but the image capturing apparatus and the image processing apparatus can be separately provided.

According to a first exemplary embodiment, a region likely to show significant image-quality degradation compared with other region within an image (a frame) is identified, and encoding of the identified region is controlled differently from encoding control for other region. An image capturing apparatus according to the present exemplary embodiment will be described below. The description will be provided using a moving image as an example.

Figure 1:
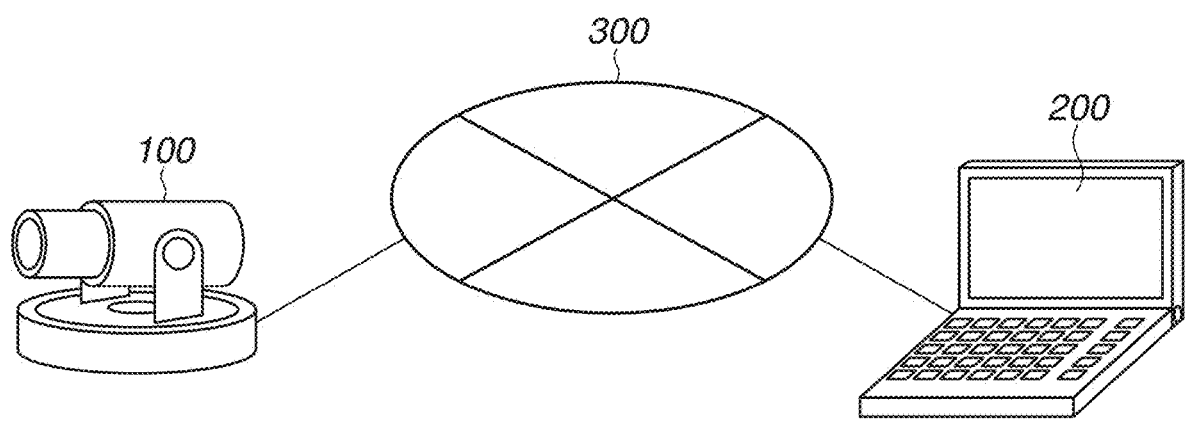
FIG. 1 is a diagram illustrating a network configuration including a configuration of an image capturing apparatus according to each of exemplary embodiments.

FIG. 1 is a diagram illustrating a system configuration including an image capturing apparatus (an image processing apparatus) 100. A client apparatus 200 is an external apparatus of the image capturing apparatus 100. The image capturing apparatus 100 and the client apparatus 200 are connected in a state where these apparatuses can communicate with each other via a network 300.

The client apparatus 200 transmits commands to the image capturing apparatus 100. The commands include a distribution request command to distribute a video (image) stream, and a setting command to set a parameter related to encoding. The image capturing apparatus 100 distributes the video stream to the client apparatus 200 in response to the distribution request command. The client apparatus 200 can be implemented by installing a program on a computer such as a personal computer, a tablet terminal, or a smartphone.

Figure 2:
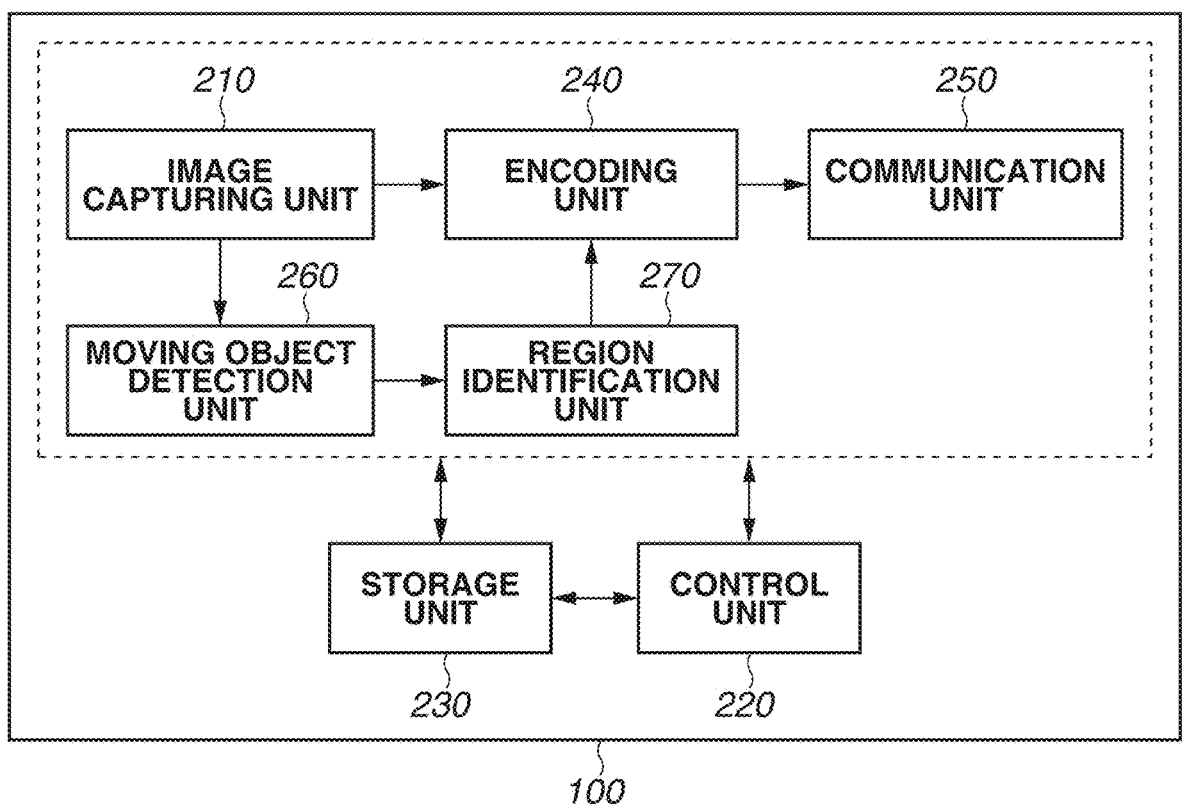
FIG. 2 is a block diagram illustrating a configuration of an image capturing apparatus according to a first exemplary embodiment.

FIG. 2 is a block diagram illustrating the image capturing apparatus 100 according to the first exemplary embodiment. The image capturing apparatus 100 has an image capturing unit 210, a control unit 220, a storage unit 230, an encoding unit 240, a communication unit 250, a moving object detection unit 260, and a region identification unit 270.

The image capturing unit 210 receives light formed by a lens, at an image capturing element. The image capturing unit 210 converts the received light into electric charge, thereby generating image data of a moving image. For the image capturing element, for example, a complementary metal oxide semiconductor (CMOS) image sensor can be used. A charge coupled device (CCD) image sensor may also be used for the image capturing element. The image capturing unit 210 may generate (acquire) image data obtained by appropriately adjusting, for example, white balance and exposure, according to parameters set through the control unit 220. An example in which the image capturing unit 210 thus functions as an image acquisition unit will be described. However, only a function as the image acquisition unit is to be provided, image data of a moving image may also be acquired from outside.

The control unit 220 controls operation of each unit in the image capturing apparatus 100, and performs various kinds of processing. For example, the control unit 220 sets camera parameters such as white balance and exposure in the image capturing unit 210, and sets an encoding parameter for encoding to the encoding unit 240.

The moving object detection unit 260 detects a moving-object region in each frame (image frame) of the image data generated by the image capturing unit 210. For example, the moving object detection unit 260 detects the moving-object region by using an inter-frame difference method or a background difference method. These methods each perform detection based on a difference value between a pixel value of a detection-target frame and a pixel value of other image (e.g., a background image).

Alternatively, the moving-object region may be determined for each of predetermined blocks into which the frame is segmented. In that case, for example, when the difference value exceeds a threshold in half or more of pixels within a block, this block may be determined as the moving-object region. Further, the block for the determination whether or not it is the moving-object region may be a unit (a block), to which a quantization parameter is assigned in the encoding. For example, in a case where H.264/AVC is used, the block may be a macroblock. In a case where H.265/HEVC is used, the block may be a coding unit (CU) or a unit formed of a plurality of CUs.

The region identification unit 270 compares a result of moving-object detection performed on the current frame with a result of moving-object detection performed on a frame preceding the current frame, thereby identifying a region more likely to have image-quality degradation than other region within an image (a frame). Processing in the region identification unit 270 will be described in detail below.

The encoding unit 240 performs encoding of the current frame, based on the position of the region identified by the region identification unit 270. Processing in the encoding unit 240 will also be described in detail below.

The storage unit 230 stores a program and various kinds of information that are necessary for processing performed by the control unit 220. The storage unit 230 stores, for example, information about camera parameters such as white balance and exposure for the image data acquired by the image capturing unit 210, and parameters related to encoding. These pieces of information are appropriately read out and used by each of other units.

The communication unit 250 transmits the image data encoded by the encoding unit 240 to the client apparatus 200 via the network 300 in, for example, stream format.

Here, the image-quality degradation, which is decreased in the exemplary embodiments, will be described.

First, a compression technology will be described, which can further cause the image-quality degradation that the exemplary embodiments aim to decrease. In an image capturing apparatus installed for monitoring, in many cases, a motion is smaller or a focusing target is limited in an acquired image as compared with a normal video camera. Therefore, compression technologies suitable for these characteristics are used, but these compression techniques can partially cause significant image-quality degradation.

For example, there is a technology for dynamically changing a length of group of pictures (GOP), which is called a dynamic GOP technology.

Here, the dynamic GOP technology will be described. In H.264/AVC and H.265/HEVC, there are a frame called an I frame and a frame called a P frame. Further, there is a frame called a B frame.

The I frame is a frame for performing encoding without using inter-frame prediction (inter-prediction), in each region within the I frame that is a compression target. The inter-frame prediction is prediction performed using an image of one or more other frames. More specifically, in a case where prediction encoding is performed in the I frame, basically, intra-frame prediction (intra-prediction) is used. Further, the P frame and B frame are frames for performing encoding by using the inter-frame prediction, in a case where any of regions within the compression target frame is compression-encoded. In other words, I frame is a frame which can use only intra-prediction, and P frame and B frame are frames which can use both of inter-prediction and intra-prediction.

The dynamic GOP technology is a technology for dynamically controlling the ratio between the I frame and the P frame. In general, the I frame has a larger amount of code (data amount) than the P frame. In a case where the GOP control is not performed, the ratio between the I frame and the P frame is constant. The dynamic GOP control reduces an overall amount of code by replacing the I frame with the P frame according to the content of an image. In other words, this technology dynamically changes an interval for insertion of the I frame, according to the situation.

The I frame and the P/B frame will be described in more detail.

A case will be described where, as an example, the image size of a frame is 3840×2160 pixels, a frame rate is 30 fps, and image capturing is performed for 30 frames per second. A quantization parameter (qP) value for determining image quality of compression can be, for example, 32. Assume that a default GOP length in a case where the dynamic GOP technology is not used is 1 second. In this case, if the dynamic GOP control is not performed, one in every 30 frames is generated as the I frame, and each of the remaining 29 frames is the P or B frame because the frame rate is 30 fps.

Figure 4:
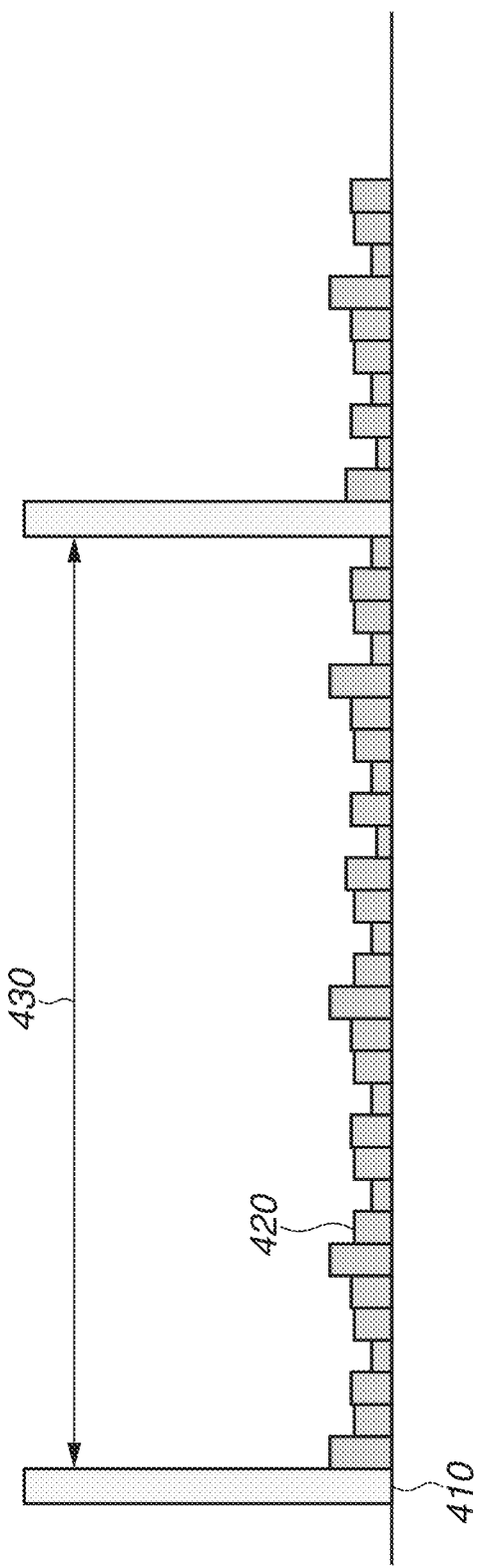
FIG. 4 is a diagram schematically illustrating size variations in I frame and P frame in H.264 or H.265.

FIG. 4 schematically illustrates a relationship among an I frame 410, a P or B frame 420, and a GOP length 430. In the schematic diagram, the vertical axis indicates the frame size (the magnitude of an amount of code), and the horizontal axis indicates the time. The diagram shows that subsequent to the I frame 410 having a large amount of code, 29 frames are created as the P frames 420 having a small amount of code. In this way, in general, the I frame has a larger amount of code than the P and B frames.

In the present exemplary embodiment, a case will be described where the B frame is not assumed and only the P frame is used. However, the B frame may be used in each of the exemplary embodiments.

As described above, if the GOP length (an interval from generation of the I frame to generation of the next I frame) is increased by the dynamic GOP technology, the number of the I frames can be reduced as appropriate. This is effective in reducing the data amount. However, for the P/B frame, encoding is performed using an image of other frames and therefore, the P/B frame can be readily influenced by image-quality degradation in other frames. More specifically, image-quality degradation remains at the same place until encoding is performed on the I frame, in some cases.

Besides the dynamic GOP technology, there is a technology for dynamically changing the position of a region of interest (ROI), which is called a dynamic ROI technology. The ROI is a region to be targeted by a user. This region is set by the user, or automatically set according to a result of image analysis by an image capturing apparatus or a client apparatus.

The dynamic ROI technology dynamically changes a position for setting the ROI, according to, for example, a position where a moving object in an image is detected, so that high image quality is partially provided. In other words, this technology dynamically changes the position of a region in an image where image quality is to be improved according to the situation.

In the encoding, regions in an image can be quantized and encoded by using different parameters. Compression with a larger quantization parameter value (hereinafter referred to as the qP value) results in lower image quality. This is because a quantization step increases as a quantization parameter value rises.

In a case where image quality is improved by the dynamic ROI technology in only an important region, for example, if image-quality degradation occurs in a region other than the ROI for some reason, this degradation may become more conspicuous.

As described above, the present exemplary embodiment is also applicable to an apparatus other than the image capturing apparatus for monitoring. However, the present exemplary embodiment is more effective when combined with a technology by which the above-described image-quality degradation is highly likely to show up.

Figure 3:
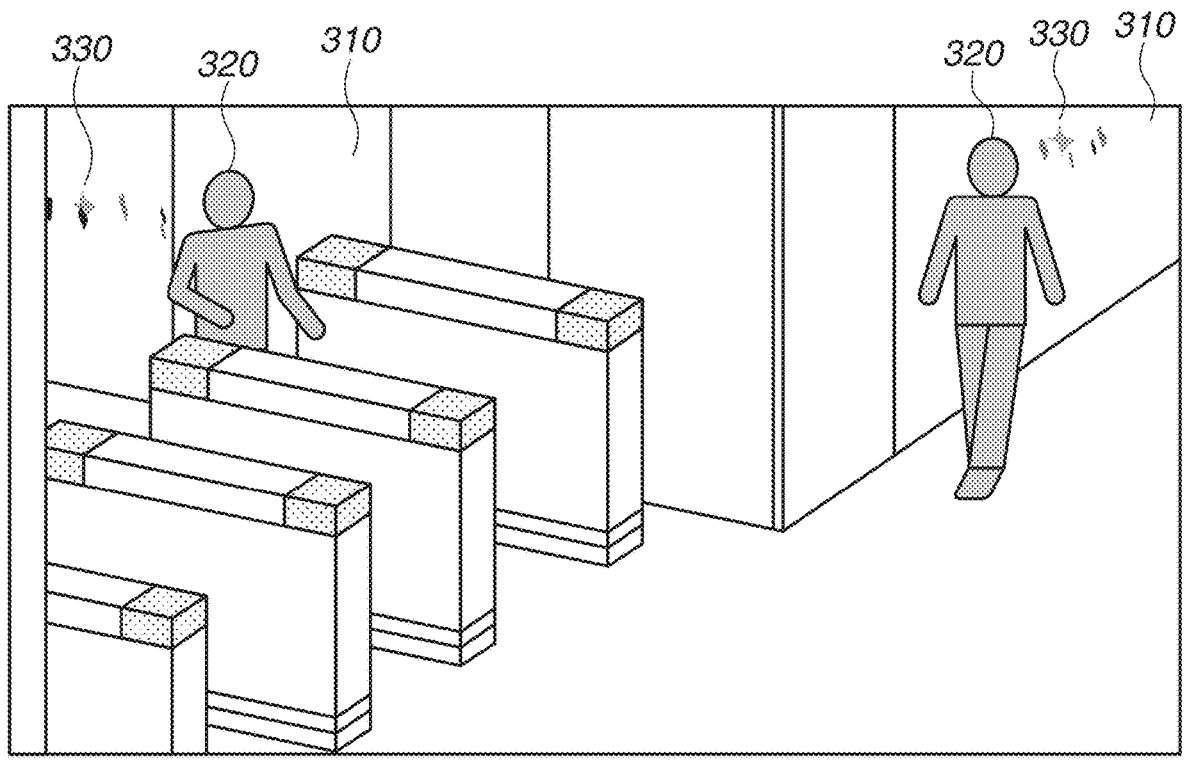
FIG. 3 is a diagram schematically illustrating an image showing image-quality degradation, according to the first exemplary embodiment.

FIG. 3 is a diagram schematically illustrating the image-quality degradation, which is to be decreased in each of the exemplary embodiments.

FIG. 3 illustrates, as an example, a scene at which a person 320 who is a moving object passes through a flap gate used for confirming an identification (ID) card. As often seen in a place such as an office building, a wall region 310 that is a background is relatively flat. The person 320 passes through the flap gate there, and image-quality degradation 330 is occurring behind the person. As illustrated in FIG. 3, the head of the person 320 (a passerby) has dark color (such as black), whereas the wall region 310 has whitish color which is relatively monotonous (flat), i.e., a difference in contrast is large. In this case, the image-quality degradation 330 becomes easily conspicuous. Causes of such image quality degradation are thought to be a difference in contrast, and a reduction in predictability (motion-vector search accuracy) in the inter-frame prediction. In any case, image-quality degradation may occur after a moving object passes through a non-moving-object region (a region other than a moving-object region). More particularly, even after the moving object disappears, the image-quality degradation may remain in the non-moving-object region such as a wall due to the influence of the moving object.

Next, processing by the image capturing apparatus 100 according to the first exemplary embodiment will be described with reference to a flowchart in FIG. 5.

In step S510, the control unit 220 acquires setting (information) about image data from the storage unit 230 and sets the acquired information in the image-capturing unit 210. Here, the information about the image data include the frame rate and the image size (resolution) of an image to be generated. For example, in the present exemplary embodiment, the image size is 3840×2160 pixels, and the frame rate is 30 fps.

In step S510, the control unit 220 acquires setting (information) about encoding from the storage unit 230, and sets the acquired information in the encoding unit 240. In the present exemplary embodiment, for example, assume that the dynamic ROI is executed using encoding in conformity with H.264. Further, assume that the qP value is 32 in the ROI, and 47 in a non-ROI (a region other than the ROI). In the present exemplary embodiment, a case is described as an example where the dynamic GOP is not performed and the GOP length is fixed at 10 seconds. However, the present exemplary embodiment is not limited to the case where the fixed GOP is adopted, and the dynamic GOP may be concurrently used.

Next, in step S520, the image capturing unit 210 generates image data according to the set information. The generated image data is then output to the moving object detection unit 260 and the encoding unit 240.

In step S530, the moving object detection unit 260 performs moving object detection processing for each frame of the image data generated in step S520. The moving object detection processing may be performed for all frames of the image data or may be performed at intervals of a few frames. A plurality of methods is known as a moving-object detection method. In general, there are an inter-frame difference method and a background difference method. In the inter-frame difference method, a motion region is detected from a difference between frames. In the background difference method, a background image is generated, and a motion region is detected as a foreground relative to a background based on a difference from the background image.

Assume that the inter-frame difference method is used. In this case, the moving object detection unit 260 calculates a difference value between a pixel value of a frame (the current frame) that is a moving-object detection target and a pixel value of a frame (e.g., a immediately preceding frame) captured at the timing different from that of the current frame. A region where the difference value is equal to or more than a predetermined threshold is determined as a moving-object region.

Further, in a case where the background difference method is used, for example, a frame captured when no moving object is assumed to be present is determined as a background image. Subsequently, a difference value between a pixel value of the background image and a pixel value of the current frame is calculated. A region where the difference value is equal to or more than a predetermined threshold is determined as a moving-object region.

A pixel having a difference value smaller than a threshold may be determined as a moving-object region, based on the position of a pixel exceeding a predetermined threshold. For example, in a case where a pixel having a difference value smaller than a threshold is surrounded by pixels having a difference value equal to or more than the threshold, the pixel having the smaller difference value may be determined as a moving-object region.

In a case where the background difference method is used, following processing may be adopted. First, the moving object detection unit 260 extracts a feature amount by segmenting the acquired frame into a plurality of regions (blocks). The moving object detection unit 260 then compares the extracted feature amount with a feature amount in a background image for each region, thereby determining whether the frame is a background or a foreground (a moving-object region). The region in this case is formed of 16×16 pixels, which is a unit of a macroblock of H.264. However, the size of the region can be changed depending on, for example, the image size. As the feature amount used here, for example, a transformation coefficient on low frequency side in a case where a pixel luminance value within a region is subjected to discrete cosine transformation (DCT), can be used. Color information may also be used. Further, a value such as an average of a plurality of frames may be used for a background image.

The feature amount of a background image can be prepared for each region. This feature amount for each region is gradually updated as the image changes over time. As such an updating method, it is possible to use a method for replacing an image less frequently referenced as a background image than before, with a new background image. It is also possible to use a method of updating, in which a feature amount of a region of the current frame is reflected when referenced. The former can address a case where a background itself varies, and the latter can address a case where a background gradually varies due to changes such as changes in sunshine.

In this way, the moving object detection unit 260 performs a comparison with the feature amount of a plurality of backgrounds for each region, thereby determining whether the region is a background (a non-moving-object region) or a foreground (a moving-object region). The moving object detection unit 260 then performs post-processing such as isolated-point removal (processing for determining that a background is the foreground if the background is surrounded by pixels determined as a foreground), and determines the final moving-object region. Information indicating the position of the moving-object region thus acquired is stored in the storage unit 230. Further, the moving object detection unit 260 outputs the information indicating the position of the moving-object region into the region identification unit 270. The information indicating the position of the region may be expressed by, for example, coordinates based on a pixel position using the upper left corner of the frame as an origin point, or may be the number of the region if the position of the region is fixed.

In step S540, the region identification unit 270 identifies a region having a degradation possibility where image-quality degradation is highly likely to occur, by using the position of the moving-object region of the current frame acquired in step S530, and the position of a moving-object region identified in a previous frame.

Specifically, the region identification unit 270 acquires information indicating the position of the moving-object region in the previous frame stored in the storage unit 230. The region identification unit 270 then compares the acquired information with the position of the moving-object region in the current frame, thereby identifying a region that is a non-moving-object region in the current frame but is a moving-object region in the previous frame.

In addition, the region identification unit 270 determines the moving-object region in the current-frame to be an ROI. Moreover, the region identification unit 270 determines a region, which is a non-moving-object region in the current frame and a non-moving-object region in the previous frame as well, to be a non-ROI. Further, as described above, the region identification unit 270 determines a changed region, which is a non-moving-object region in the current frame but a moving-object region in the previous frame, as the region having a degradation possibility where the image-quality degradation is likely to occur. These identification results are then output into the encoding unit 240. Thus, the region having a degradation possibility is the region changed from the moving-object region to the non-moving-object region.

Next, in step S550, the encoding unit 240 determines the content of encoding appropriate to each region identified in step S540. For example, the encoding unit 240 determines a prediction method or a parameter (e.g., the qP value).

For example, as for the ROI, the qP value is 32 to enhance the image quality. As for the non-ROI, the qP value is larger than the ROI by 15. In other words, the qP value is 47. As for the region having a degradation possibility, although this region is a non-ROI region, the qP value is 32. In this way, in the region having a degradation possibility, the qP value is at least smaller than that of other non-moving-object region (here, the non-ROI). Thus, even in a situation where image-quality degradation occurs, the degradation can be reduced. As described above, the image quality is higher when the qP value is small than when the qP value is large. Here, the qP value of the region having a degradation possibility is the same as the qP value of the ROI. However, in a case where a larger value (e.g., a qP value of about 36) is set as the qP value of the ROI, the qP value may be smaller than the qP value of the ROI (the image quality may be higher), so as to suppress degradation due to the image-quality degradation.

For the region having a degradation possibility, the qP value may be decreased (the image quality may be enhanced) with respect to a few frames. However, merely decreasing the qP value with respect to only one frame is still effective.

The region having a degradation possibility is highly likely to become a non-ROI in the next frame. In that case, the qP value becomes a large value. More specifically, in a case where image-quality degradation occurs without executing the processing of the present exemplary embodiment, the state of the non-ROI continues. Consequently, the state of the image-quality degradation continues in the subsequent frames until an I frame is generated. To suppress such degradation, the qP value is decreased (the image quality is enhanced), which erases a trace of the image-quality degradation, although the amount of code temporarily increases. Therefore, a frame having small image-quality degradation can be generated with a small amount of code even in a case where the qP value is increased in the subsequent frames.

As the processing for the region having a degradation possibility, instead of changing the qP value, the region having a degradation possibility may be forcibly encoded using the intra-frame prediction. In other words, the processing may be restricted such that the inter-frame prediction is not used. In addition, even if the frame is the P frame, encoding can be partially performed using the intra-frame prediction. In general, a region determined as a foreground (a moving-object region) in the previous frame and determined as a background (a non-moving-object region) in the current frame is more likely to be encoded using the intra-frame prediction instead of the inter-frame prediction because a predictive residue is large. However, in a case where a foreground remains in part of the region, a predictive residue is not so large and thus the intra-frame prediction may not be selected. In such a case, degradation of a few pixels having a large predictive residue within the region may remain undissolved. Therefore, it is possible to dissolve the image-quality degradation by encoding the region having a degradation possibility with use of the intra-frame prediction. Beyond that, the region having a degradation possibility may be forcibly encoded using a mode such as an I-PCM mode or a conversion quantization bypass mode.

Further, as the processing for the region having a degradation possibility, the following may be performed.

In H.265, first, a frame is segmented into 64×64 coding tree units (CTUs). The CTU is then further segmented into coding units (CUs) according to, for example, complexity of an image. If a predictive residue is evaluated when the inter-prediction or the intra-prediction is performed in a large unit, the influence of a partially remaining predictive residue is small, which makes it difficult to select the intra-frame prediction in some cases. Therefore, the region having a degradation possibility may be configured to more easily undergo block segmentation (region segmentation) into smaller CUs. More specifically, the block segmentation may be determined using a condition on which block segmentation can be easily performed. For example, assume that a condition of performing segmentation is adopted when the complexity of a block is high. In this case, a threshold for this determination condition may be lowered. In a case where a smaller CU is adopted, encoding can be performed by setting a prediction method or parameter more finely and thus, image quality can be enhanced.

In addition, once this degradation occurs, as the GOP length becomes longer, image-quality degradation remains longer in an image. Therefore, the encoding control for the region having a degradation possibility may be changed according to the set GOP length. In a case where the set GOP length is longer, stronger processing for suppressing image-quality degradation is performed. Here, as the stronger processing for suppressing image-quality degradation, the qP value can be decreased, or the intra-frame prediction can be used for a few frames.

Figure 5:
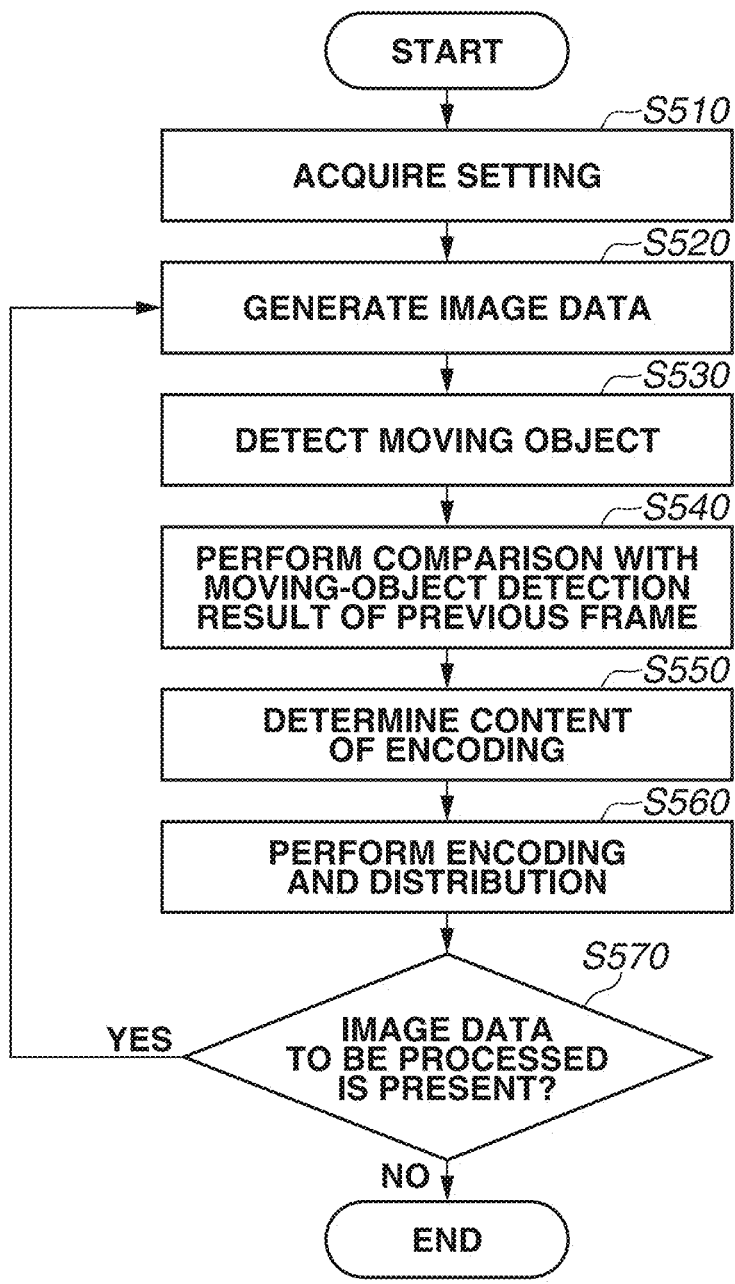
FIG. 5 is a flowchart illustrating an image processing method according to the first exemplary embodiment.

The description will continue returning to the flowchart in FIG. 5. In step S560, the encoding unit 240 encodes the current frame according to the encoding method or parameter determined in step S550. The communication unit 250 then transmits the encoded image data to an external apparatus. The image data may be recorded in a storage (not illustrated) instead of being transmitted.

In step S570, the control unit 220 determines whether there is image data to be encoded. If there is image data to be encoded (YES in step S570), the processing returns to step S520 and continues for the next image data. If there is no image data to encode (NO in step S570), the processing ends.

As illustrated in FIG. 4, in the relationship between the GOP length and the bit rate, the P frame has a size of about one-tenth of the I frame even in a scene with a motion such as the scene illustrated in FIG. 3. This ratio becomes smaller in a scene with a less motion. Therefore, if the GOP length (interval) is increased, the bit rate is reduced accordingly.

Specifically, the followings are cases where the ratio of the data amount of the P frame to the I frame is about 0.1 at 30 fps. That is, in a case where the GOP length is 2 seconds, the bit rate is reduced to about 88% as compared with a case where the GOP length is 1 second. In a case where the GOP length is 5 seconds, the bit rate is 81% as compared with the case where the GOP length is 1 second. In a case where the GOP length is 20 seconds, the bit rate is reduced to about 78% as compared with the case where the GOP length is 1 second.

Further, the following are cases where a motion becomes smaller and the ratio of the data amount of the P frame to the I frame is about 0.01. That is, in a case where the GOP length is 2 seconds, the bit rate is reduced to about 62% as compared with the case where the GOP length is 1 second. In a case where the GOP length is 5 seconds, the bit rate is reduced to about 39% as compared with the case where the GOP length is 1 second. In a case where the GOP length is 30 seconds, the bit rate is reduced to about 26% as compared with the case where the GOP length is 1 second. Therefore, if the GOP length is increased at a scene with a smaller motion, the effect of the bit-rate reduction becomes more remarkable.

As for the relationship between the GOP length and the image quality, in general, degradation in subjective image quality often becomes worse if the GOP length is increased. Examples of an index used for image evaluation in general include mean square error (MSE), peak signal-to-noise ratio (PSNR), and structural similarity (SSIM). With such an index however, it is difficult to quantitatively detect the status of the degradation. Specifically, in a case where an image includes a motion such as the image illustrated in FIG. 3, PSNR falls to about 3.8% for the first 5 frames, and to about 4.8% for the 15 frames. However, PSNR is about 5% even for the 30 frames, and remains almost unchanged afterward.

The time during which the image-quality degradation continues at the same position often depends on the GOP length. Assume that in the image in FIG. 3, it takes about 10 seconds before persons appearing from right and left disappear after passing through the flap gate. Further, assume that the GOP length is 30 seconds in a case where people pass infrequently. Furthermore, assume that the ratio of the data amount of the P frame to the I frame is 0.1 for 10 seconds of 30 seconds. Moreover, assume that the ratio of the data amount of the P frame to the I frame is 0.01 for the remaining 20 seconds. Then, in a case where the GOP length is 30 seconds, the bit rate can be about 57% as compared with the case where the GOP length is 1 second. However, image-quality degradation remains in a wide range of the image for a maximum of 20 seconds after a person passes.

In contrast, in a case where the processing of the present exemplary embodiment is performed, for example, even if the qP value of the region having a degradation possibility is the same value as the ROI, the bit rate is about 63% as compared with the case where the GOP length is 1 second. That is, as compared with the case where the GOP length is 30 seconds without executing the present exemplary embodiment, the bit rate is increased to about 10%, but with this increased amount, image data of a moving image can be generated without showing up image-quality degradation, Meanwhile, as for the method for identifying the region having a degradation possibility by using the detection of the moving-object region described in the present exemplary embodiment, the method has the following advantages as compared with a method for controlling image quality based on a motion vector search.

If the motion vector search is used, detection accuracy can be poor with respect to a motion that is slow relative to a frame rate. Specifically, for example, in such a scene that a person comes to a reception desk and makes some arrangement, a motion vector can be correctly detected in a frame in which the person walks to the reception desk. However, in a frame in which the person stays at the reception desk, a difference in motion from the previous frame is small and thus a motion vector cannot be correctly detected. If the motion vector is not correctly detected as a motion, it is also difficult to detect a boundary region between a motion region and a non-motion region. In contrast, in the method (the background difference method, in particular) described in the present exemplary embodiment, there is no person making some arrangement at the receptionist desk in the background. Therefore, the person making some arrangement can be detected as a foreground even if a motion of this person is small. For this reason, even a small motion or a slow motion can be correctly detected and thus, accuracy of identifying "region having a degradation possibility" is also higher.

In addition, in the motion vector search, there is a possibility that a moving object is large and a difference in image characteristic within the moving object is small. Specifically, when a moving object such as a truck passes, the image characteristics are almost the same within a region of the bed of the truck. In that case, a motion vector may not be detected in a region at the front of the bed in the previous frame and in a region at the rear of the bed in the current frame. In such a case, a pair of a motion region and a still region appears at each of the front and the rear of the bed, and a boundary region can be set in a middle portion of the bed, which is not a boundary to be detected. In contrast, the method (the background difference method, in particular) described in the present exemplary embodiment can correctly detect the entire truck because the background is a road where the truck is not present. Therefore, the entire bed of the truck is determined as the ROI, and the region having a degradation possibility, which is a region after the truck passes, can be accurately set at the back of the truck.

As described above, in the image capturing apparatus 100 according to the first exemplary embodiment, the region having a degradation possibility, which is highly likely to have image-quality degradation, is identified in the current frame, based on the moving-object detection result of the current frame to be compression-encoded and the previous frame. In this region, likelihood of image-quality degradation can be reduced by performing encoding using an encoding method or encoding parameter different from that of other non-moving-object region. The previous frame described here may be an immediately preceding frame or a frame a few frames before. In addition, even if the GOP length is increased using a technology such as the dynamic GOP technology, degradation in image quality can be made less conspicuous as a consequence by reducing the possibility of image-quality degradation as in the present exemplary embodiment.

Next, a second exemplary embodiment will be described. Description of a portion similar to the first exemplary embodiment will be omitted as appropriate.

In the first exemplary embodiment, the region that is the non-moving-object region in the current frame but is the moving-object region in the previous frame is identified as the region having a degradation possibility, based on the moving-object detection result of the current frame and the previous frame. In the present exemplary embodiment, control is performed in consideration of a region where image-quality degradation is not much conspicuous and complexity is high. More specifically, in the present exemplary embodiment to be described below, the complexity of a background image is calculated and stored for each region, and encoding of a region having a degradation possibility is changed according to the degree of the complexity.

Figure 6:
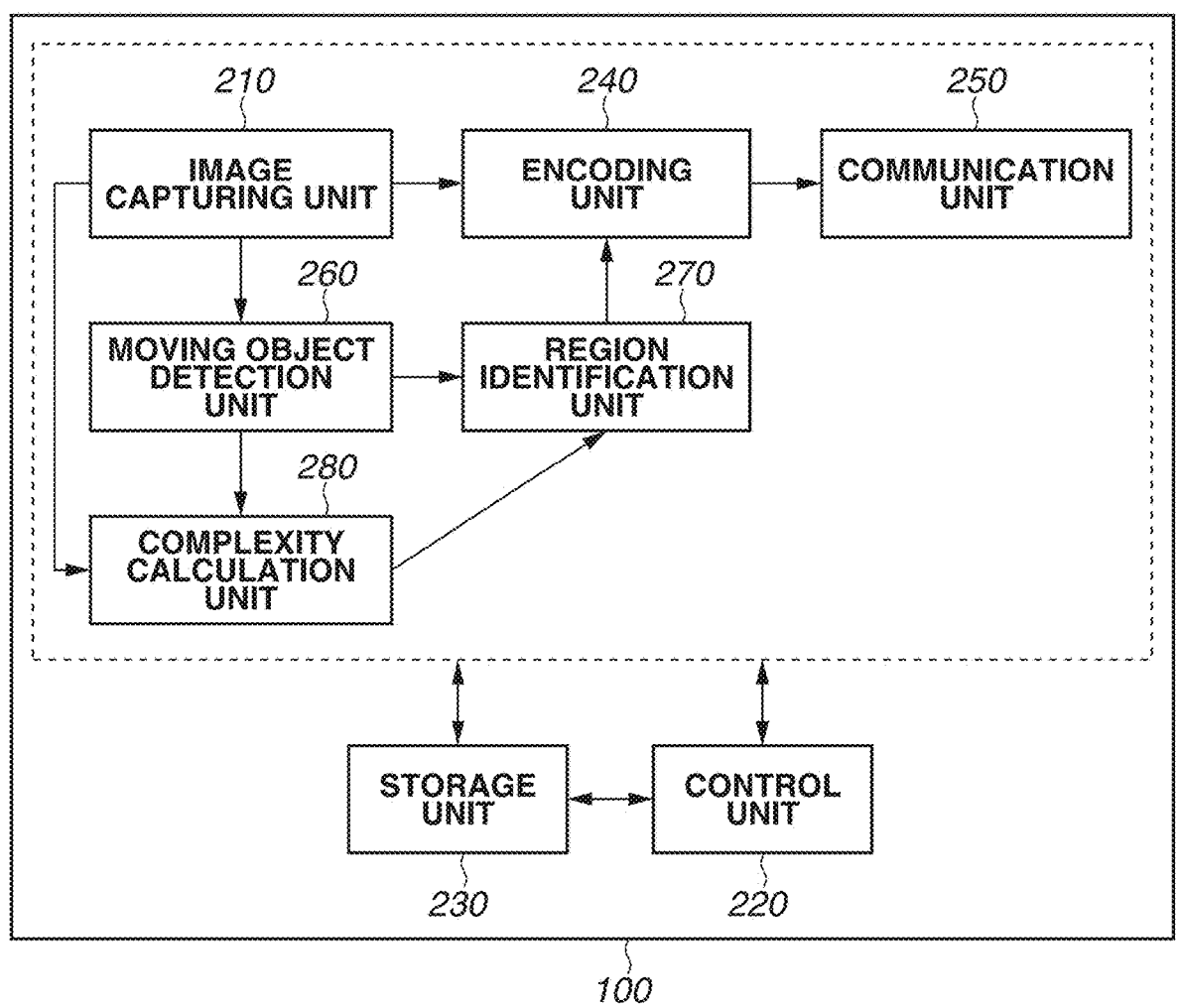
FIG. 6 is a block diagram illustrating a configuration of an image capturing apparatus according to a second exemplary embodiment.

FIG. 6 is a block diagram illustrating an image capturing apparatus 100 according to the second exemplary embodiment. Except for a complexity calculation unit 280, the block diagram illustrated in FIG. 6 is substantially similar to that of the image capturing apparatus 100 of the first exemplary embodiment illustrated in FIG. 2. Therefore, the description of this block diagram is omitted as appropriate.

The complexity calculation unit 280 calculates complexity of a background image acquired by a moving object detection unit 260 for each region in the background image. In a case where the background difference method is not used but the inter-frame difference method is used, complexity of each region of the current frame may be calculated.

Figure 7:
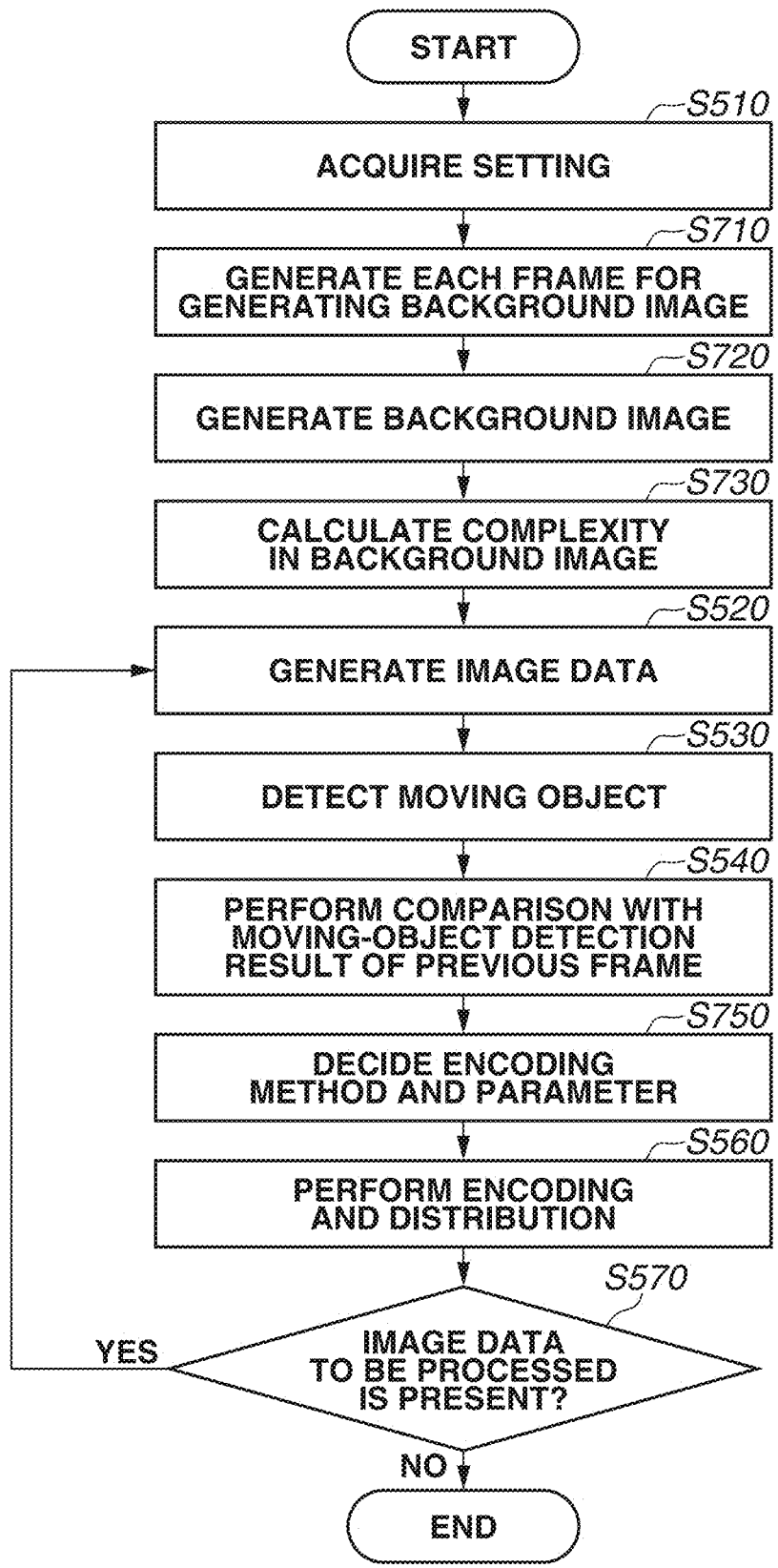
FIG. 7 is a flowchart illustrating an image processing method according to the second exemplary embodiment.

Next, processing by the image capturing apparatus 100 according to the second exemplary embodiment will be described with reference to a flowchart in FIG. 7. Except for steps S710, S720, S730, and S750, each step is similar to the corresponding step illustrated in FIG. 5 and thus will not be described.

In step S710, an image capturing unit 210 generates a plurality of images (frames) for generating a background image. The generated images are then stored in the storage unit 230.

In step 720, using the images for generating the background image acquired in step S710, the complexity calculation unit 280 generates the background image as follows.

First, the moving object detection unit 260 segments each frame stored in the storage unit 230 into predetermined regions. For example, each frame is segmented into regions each formed of 16×16 pixels. For example, in a case where a resolution is 4K (3840×2176 pixels), each frame is segmented into 32640 regions.

The moving object detection unit 260 then performs clustering (classification) on regions present at the corresponding positions (the identical positions) in each frame, by using a feature such as color information or a frequency component of each region as a feature amount. The clustering is performed in such a manner that regions having similar features belong to the same group. Only regions included in the largest cluster are integrated and determined as regions to be used for a background image. An average or a median of the pixel values of each frame is calculated, and an image obtained thereby is determined as an image to be used for the background image. Thus, a region of an image where a moving object is present can be excluded. Similar processing is performed in each region, and those regions are combined to form a background image.

Figure 8:
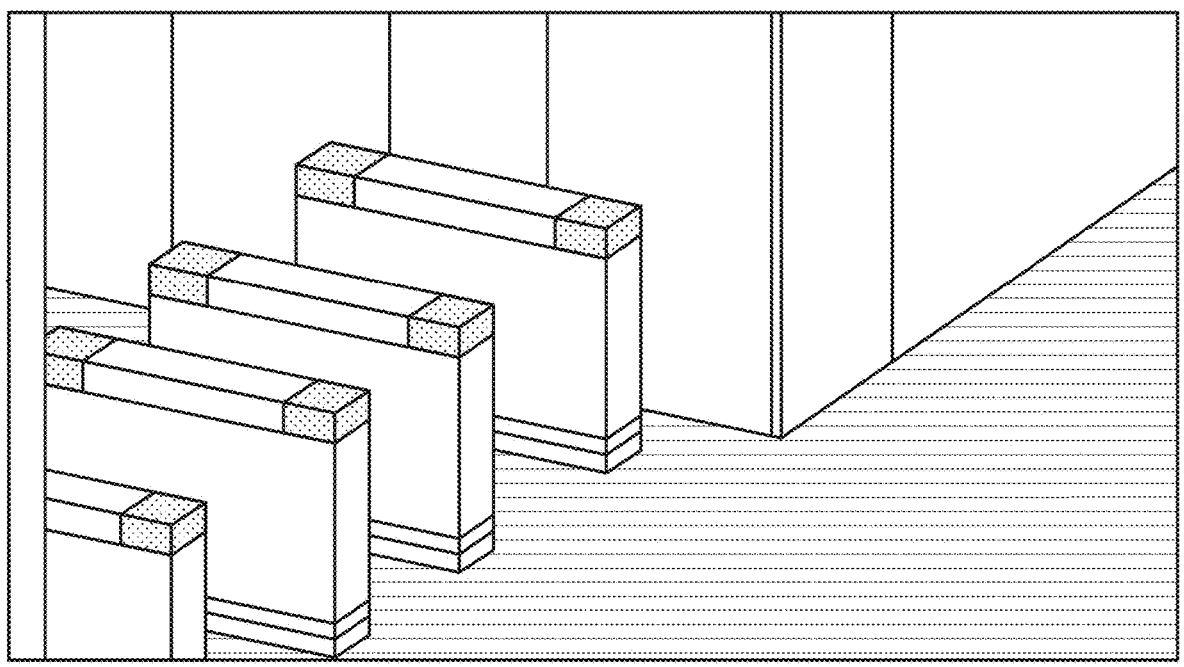
FIG. 8 is a diagram schematically illustrating a background image according to the second exemplary embodiment.

Various methods are known as methods for generating a background image. A method for holding a plurality of backgrounds for each region as candidate regions may be adopted, or a method for changing a background image over time may be used. For example, a background image may be generated by extracting a background for each subregion from images of a predetermined period of time and combining the extracted backgrounds, as described with reference to step S530 of the first exemplary embodiment. Alternatively, a frame showing no motion can be selected and determined as a background image. FIG. 8 illustrates air example of a background image generated from an image of the flap gate scene illustrated in FIG. 3. As illustrated in FIG. 8, background image with as few moving object as possible is generated.

It is assumed that an image of each frame is acquired beforehand to generate a background image. However, the generation of a background image is not limited to such a case. It is also possible to generate and update a background image while performing image compression and distribution, as described in the first exemplary embodiment.

Next, in step S730, the complexity calculation unit 280 calculates complexity of the background image generated in step S720, for each region. The region described here is each of the regions into which the frame is segmented when the background image is generated.

The complexity calculation unit 280 calculates the complexity of each region by using, for example, filtering processing by a filter of a kernel size of 13×13. The filter extracts an edge in a longitudinal direction and a lateral direction, by using a kernel that becomes a low-pass filter in a vertical direction and a band-pass filter in a horizontal direction, and a kernel obtained by switching the vertical component and the horizontal component of the former kernel. Then, the size of the edge calculated for each pixel is integrated for each subregion. The complexity for each subregion can be thereby calculated.

Figure 9:
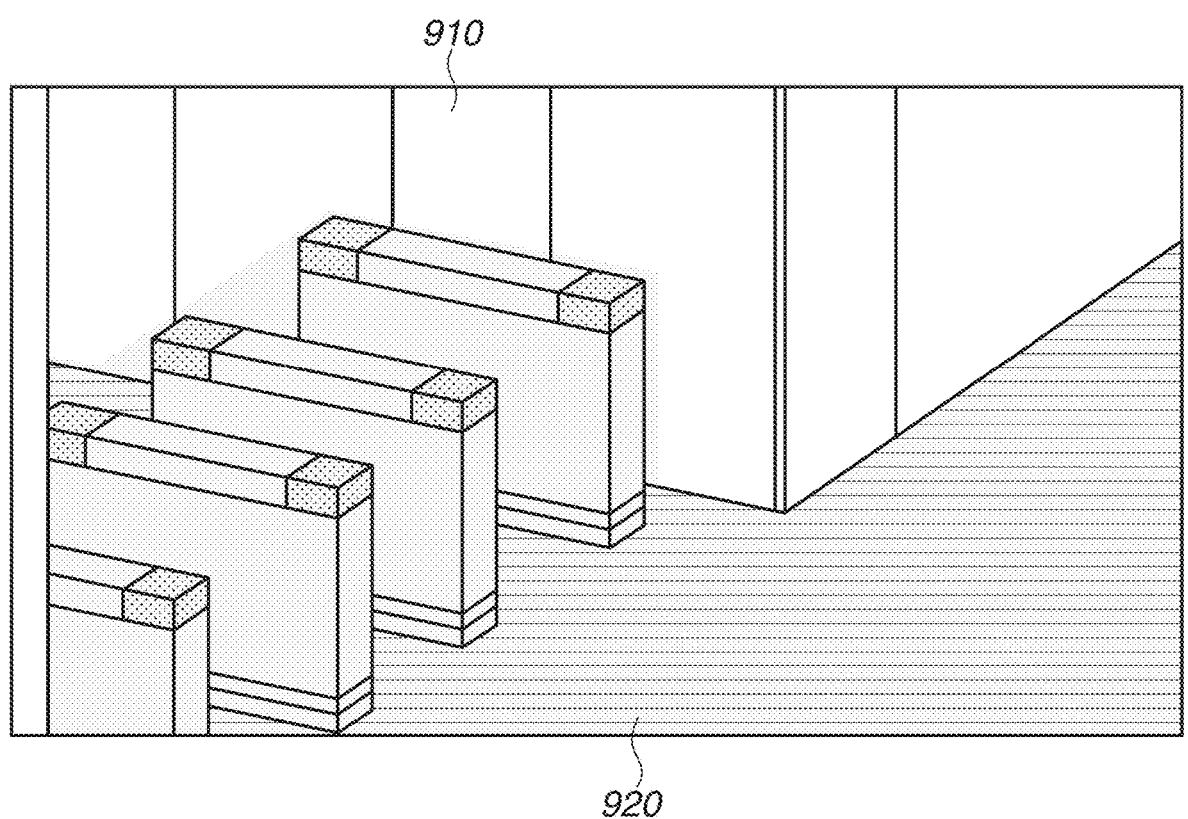
FIG. 9 is a diagram schematically illustrating a region showing high complexity and a region showing low complexity in the background image according to the second exemplary embodiment.

FIG. 9 illustrates a schematic diagram of an example in which classification into a high complexity region and a low complexity region is performed based on a predetermined threshold from the result of calculating the complexity for the acquired background image illustrated in FIG. 8. FIG. 9 illustrates a region 910 with complexity less than the predetermined threshold and a region 920 with complexity equal to or more than the predetermined threshold. In FIG. 8, a floor portion has a pattern and thus the complexity of this portion is high. The complexity may not be segmented into two levels but may be classified into a larger number of levels. Alternatively, a value indicating the degree of complexity may be simply used.

In step S750, the encoding unit 240 performs encoding control based on the result of the region segmentation acquired in step S540, and the complexity of each region of the background image acquired in step S730.

Specifically, as in step S550, the qP value of a moving-object region (ROI) is determined to be 32, and the qP value of a non-ROI is determined to be 47. As for a region having a degradation possibility, the same qP value 47 as that of the non-ROI is set to a high complexity region, and the same qP value 32 as the qP value within the ROI is set to a low complexity region. In this way, even if a region has a degradation possibility, the qP value varies depending on the complexity of the background image corresponding to this region.

Various methods can be used for the encoding control of the region having a degradation possibility according to the complexity. Specifically, the qP value of the region having degradation possibility can be continuously changed to a value within/outside the ROI, according to the value of the complexity of the background. In other words, the qP value of the region having the degradation possibility may be determined in such a manner that as the complexity is higher, the qP value of the non-ROI is closer to 47, and the qP value of the ROI of low complexity is closer to 47.

The encoding mode of the region having a degradation possibility may be determined to be an intra-frame prediction mode (an intra-prediction mode) if the complexity of this region is lower than a threshold.

More specifically, in a region with high complexity, an increase in the amount of code is large in a case where the qP value is decreased or the encoding mode is the intra mode. Therefore, considering cost effectiveness, by addressing the image-quality degradation only for a region with low complexity, it is possible to suppress the image-quality degradation more appropriately while preventing an excessive rise in bit rate.

As described above, in the image capturing apparatus 100 according to the second exemplary embodiment, the encoding parameter such as the qP value or the encoding mode (the intra-prediction or the inter-prediction) is determined, considering the complexity of the background in addition to the comparison between the current frame and the previous frame in to s of the moving-object detection result. Therefore, it is possible to suppress an increase in bit rate by increasing image quality of a region where an influence on subjective image quality is small, and thus to suppress image-quality degradation only for a region where an influence on subjective image quality is large.

The second exemplary embodiment describes the method for generating the background image and calculating the complexity of the background image, thereby changing the encoding control of the region having a degradation possibility depending on the complexity of the background of this region. In a third exemplary embodiment, to extract the region having a degradation possibility where image-quality degradation is conspicuous, a region where a contrast between a background image and a foreground (a moving-object region) is high, is determined to be a region where image-quality degradation is conspicuous.

Specifically, after the complexity of the background image is calculated in step S730 in the second exemplary embodiment, color information for each region of the background image is acquired. The color information can be an average of RGB for each region.

When the encoding control for the region having a degradation possibility is performed in step S750, the color information of the region having a degradation possibility and the color information of the region of the corresponding background image are compared. If the difference is large (if the contrast is high), processing for more strongly suppressing image-quality degradation is performed. For example, if an average of the differences in color information is equal to or more than a predetermined threshold, the difference is determined to be large, and processing similar to that for a region with low complexity is performed. The processing for more strongly suppressing image-quality degradation may be performed in a case where the qP value is decreased, or the encoding mode is set to the intra mode.

Other Embodiments

Next, a hardware configuration for implementing each function of the exemplary embodiments will be described with reference to FIG. 10. Components except for the lens and the mechanical portions in the image capturing apparatus 100 can be implemented by the hardware configuration illustrated in FIG. 10.

A random access memory (RAM) 451 temporarily stores a computer program to be executed by a central processing unit (CPU) 450. The RAM 451 temporarily stores also data such as a command and image data acquired from outside via a communication interface 453. Further, the RAM 451 provides a work area to be used when the CPU 450 executes various kinds of processing. The RAM 451 also functions as, for example, a frame memory and a buffer memory.

The CPU 450 executes a computer program stored in the RAM 451. Other than the CPU, a processor such as a digital signal processor (DSP) or an application specific integrated circuit (ASIC) may be used.

A hard disk drive (HDD) 452 stores a program of an operating system and image data.

A computer program and data stored in the HDD 452 are loaded into the RAM 451 as appropriate under control of the CPU 450, and executed by the CPU 450. Other than the HDD, a storage medium such as a flash memory may be used. A bus 454 connects each hardware. The hardware exchanges data with each other via the bus 454. The hardware configuration described above is employed in each exemplary embodiment.

The present disclosure can also be implemented in the processing performed by reading out a program for implementing one or more functions of the above-described exemplary embodiments and executing the program by one or more processors. The program may be supplied to a system or apparatus having a processor via a network or storage medium. The present disclosure can also be implemented by a circuit (e.g., an ASIC) for implementing one or more functions of the above-described exemplary embodiments.

Figure 10:
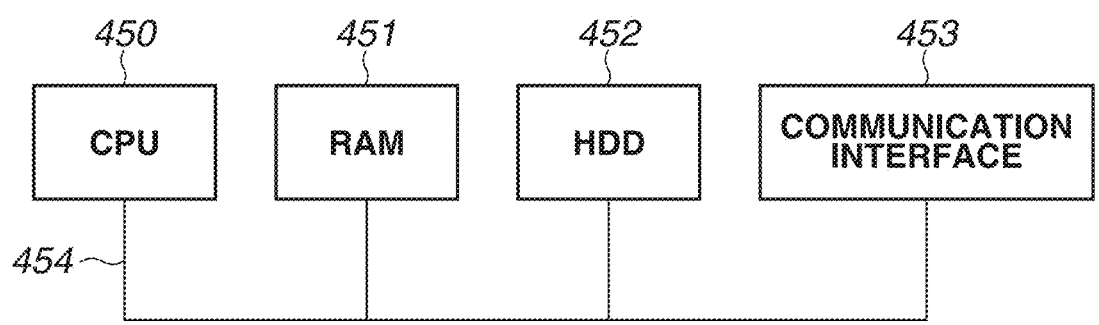
FIG. 10 is a diagram illustrating hardware configuration of the image capturing apparatus according to each of the exemplary embodiments.

All the components of the image capturing apparatus may be implemented by the hardware illustrated in FIG. 10, and may also be implemented by software.

The present disclosure is not limited to the above-described exemplary embodiments, and can be variously modified in the scope within a spirit of the present invention. For example, a combination of the exemplary embodiments is also included in the disclosure of the present specification.

According to the above-described exemplary embodiments, it is possible to reduce likelihood of generating a region where image quality is significantly degraded compared with other regions in an image, in a case where the encoding is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-91759, filed Sep. 29, 2017, which is hereby incorporated by reference herein in its entirety.

What is claimed is:

1. An image processing apparatus comprising a computer executing instructions that, when executed by the computer, cause the computer to function as:

an image acquisition unit configured to acquire image frames of a moving image captured by an image capturing unit;

a detection unit configured to perform foreground detection processing for detecting foreground from the image frames acquired by the image acquisition unit;

an identification unit configured:

to identify a first region in an image frame to be encoded as a first type background region to be encoded by quantization using a first quantization parameter smaller than a second quantization parameter and a third quantization parameter, in a case where (i) the foreground has been detected in a region corresponding to the first region in a preceding image frame preceding the image frame to be encoded and (ii) the foreground has not been detected in the first region in the image frame to be encoded;

to identify a second region in the image frame to be encoded as a second-type background region to be encoded by quantization using the second quantization parameter, in a case where (i) the foreground has not been detected in a region corresponding to the second region in the preceding image frame and (ii) the foreground has not been detected in the second region in the image frame to be encoded; and to identify a third region in the image frame to be encoded as a foreground region to be encoded by quantization using a third quantization parameter smaller than the second quantization parameter, in a case where the foreground has been detected in the third region in the image frame to be encoded; and an encoding unit configured to encode the first-type background region in the image frame to be encoded by quantization using the first quantization parameter which is smaller than the second quantization parameter for the second-type background region, wherein a quantization step in the quantization gets smaller as a value of the quantization parameter gets smaller.

2. The image processing apparatus according to claim 1, wherein the preceding image frame is an image frame immediately before the image frame to be encoded.

3. The image processing apparatus according to claim 1, wherein the encoding unit determines the quantization parameter for the first-type background region, so that a value of the quantization parameter becomes smaller if a GOP length becomes longer.

4. The image processing apparatus according to claim 1, wherein, the encoding unit encodes the image frame to be encoded, by using encoding control conditioned to segment a block more frequently for the first-type background region than for the second-type background region.

5. The image processing apparatus according to claim 1, wherein the instructions further cause the computer to function as:
a background image generation unit configured to generate a background image from the image frames acquired by the image acquisition unit; and
a complexity calculation unit configured to calculate complexity of each region in the background image,
wherein the encoding unit determines the quantization parameter of the first-type background region, further based on the complexity.

6. An image processing method comprising:
acquiring image frames of a moving image captured by an image capturing unit;
performing foreground detection processing for detecting foreground from the acquired image frames;
identifying a first region in an image frame to be encoded as a first-type background region to be encoded by quantization using a first quantization parameter smaller than a second quantization parameter and a third quantization parameter, in a case where (i) the foreground has been detected in a region corresponding to the first region in a preceding image frame preceding the image frame to be encoded and (ii) the foreground has not been detected in the first region in the image frame to be encoded;
identifying a second region in the image frame to be encoded as a second-type background region to be encoded by quantization using the second quantization parameter, in a case where (i) the foreground has not been detected in a region corresponding to the second region in the preceding image frame and (ii) the foreground has not been detected in the second region in the image frame to be encoded; and
identifying a third region in the image frame to be encoded as a foreground region to be encoded by quantization using a third quantization parameter smaller than the second quantization parameter, in a case where the foreground has been detected in the third region in the image frame to be encoded; and
encoding the first-type background region in the image frame to be encoded by quantization using the first quantization parameter which is smaller than the second quantization parameter for the second-type background region, wherein a quantization step in the quantization gets smaller as a value of the quantization parameter gets smaller.

7. A non-transitory computer-readable recording medium storing a program for causing the computer to function as:
an image acquisition unit configured to acquire image frames of a moving image captured by an image capturing unit;
a detection unit configured to perform foreground detection processing for detecting foreground from the image frames acquired by the image acquisition unit;
an identification unit configured:
to identify a first region in an image frame to be encoded as a first-type background region to be encoded by quantization using a first quantization parameter smaller than a second quantization parameter and a third quantization parameter, in a case where (i) the foreground has been detected in a region corresponding to the first region in a preceding image frame preceding the image frame to be encoded and (ii) the foreground has not been detected in the second region in the image frame to be encoded;
to identify a second region in the image frame to be encoded as a second-type background region to be encoded by quantization using the second quantization parameter, in a case where (i) the foreground has not been detected in a region corresponding to the second region in the preceding image frame and (ii) the foreground has not been detected in the second region in the image frame to be encoded; and
to identify a third region in the image frame to be encoded as a foreground region to be encoded by quantization using a third quantization parameter smaller than the second quantization parameter, in a case where the foreground has been detected in the third region in the image frame to be encoded; and
an encoding unit configured to encode the first-type background region in the image frame to be encoded by quantization using a quantization parameter smaller than a quantization parameter for the second-type background region, wherein a quantization step in the quantization gets smaller as a value of the quantization parameter gets smaller.

* * * * *